(12) United States Patent
Greene et al.

(10) Patent No.: US 9,563,704 B1
(45) Date of Patent: Feb. 7, 2017

(54) METHODS, SYSTEMS, AND MEDIA FOR PRESENTING SUGGESTIONS OF RELATED MEDIA CONTENT

(71) Applicant: Google Inc., Mountain View, CA (US)

(72) Inventors: Kevin Greene, San Francisco, CA (US); Timothy Johnson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 176 days.

(21) Appl. No.: 14/161,327

(22) Filed: Jan. 22, 2014

(51) Int. Cl.
*G06F 17/30* (2006.01)

(52) U.S. Cl.
CPC ... *G06F 17/30861* (2013.01); *G06F 17/30253* (2013.01)

(58) Field of Classification Search
CPC ............ G06F 17/3053; G06F 17/30253; G06F 17/30684
USPC .......................... 707/723, 748, 751, 784, 741
See application file for complete search history.

(56) References Cited

U.S. PATENT DOCUMENTS

| | | | | |
|---|---|---|---|---|
| 8,572,094 B2 * | 10/2013 | Luo | ..................... | G06F 17/3053 707/748 |
| 2007/0011012 A1 * | 1/2007 | Yurick | .................... | G10L 15/26 704/277 |
| 2011/0022602 A1 * | 1/2011 | Luo | ..................... | G06F 17/3053 707/723 |
| 2011/0069230 A1 * | 3/2011 | Polumbus | ......... | G06F 17/30746 707/706 |
| 2012/0047026 A1 * | 2/2012 | Ranauro | ................ | G06Q 10/00 705/14.72 |
| 2012/0296920 A1 * | 11/2012 | Sahni | ...................... | H04L 67/22 707/749 |
| 2013/0073473 A1 * | 3/2013 | Heath | .................... | G06Q 30/02 705/319 |
| 2013/0080968 A1 * | 3/2013 | Hanson | ................ | G06F 9/4443 715/783 |
| 2013/0097159 A1 * | 4/2013 | Park | ...................... | G06Q 50/01 707/723 |
| 2014/0196090 A1 * | 7/2014 | Kataoka | ............... | H04N 21/482 725/43 |

* cited by examiner

*Primary Examiner* — Vincent Boccio
(74) *Attorney, Agent, or Firm* — Byrne Poh LLP

(57) ABSTRACT

Methods, systems, and media for presenting suggestions of related media content are provided. In some embodiments, the method comprises: generating, using a hardware processor, a transcript of a first media content item; receiving one or more social network posts associated with one or more other media content items; computing one or more correlations between text in the one or more social network posts and the transcript; ranking the social network posts based at least in part on the correlations; and causing one or more suggestions to view the one or more other media content items associated with the one or more social network posts based at least in part on the rankings to be presented.

21 Claims, 4 Drawing Sheets

METHODS, SYSTEMS, AND MEDIA FOR PRESENTING SUGGESTIONS OF RELATED MEDIA CONTENT

TECHNICAL FIELD

The disclosed subject matter relates to methods, systems, and media for presenting suggestions of related media content.

BACKGROUND

Many users enjoy viewing media content from sites which contain a variety of types and genres of content. In such instances, users often want to be presented with suggestions of related media content that they might enjoy. However, it can be difficult to determine what content would be most relevant and/or interesting to a user based only on information (such as titles, creators, genres, and/or any other information) related to media content items a user has already watched.

Accordingly, it is desirable to provide new methods, systems, and media for presenting suggestions of related media content.

SUMMARY

Methods, systems, and media for presenting suggestions of related media content are provided. In accordance with some embodiments of the disclosed subject matter, methods for presenting suggestions of related media content are provided, the methods comprising: generating, using a hardware processor, a transcript of a first media content item; receiving one or more social network posts associated with one or more other media content items; computing one or more correlations between text in the one or more social network posts and the transcript; ranking the social network posts based at least in part on the correlations to produce rankings; and causing one or more suggestions to view the one or more other media content items associated with the one or more social network posts based at least in part on the rankings to be presented.

In accordance with some embodiments of the disclosed subject matter, systems for presenting suggestions of related media content are provided, the systems comprising: a hardware processor that is configured to: generate a transcript of a first media content item; receive one or more social network posts associated with one or more other media content items; compute one or more correlations between text in the one or more social network posts and the transcript; rank the social network posts based at least in part on the correlations to produce rankings; and cause one or more suggestions to view the one or more other media content items associated with the one or more social network posts based at least in part on the rankings to be presented.

In accordance with some embodiments of the disclosed subject matter, non-transitory computer-readable media containing computer executable instructions that, when executed by a processor, cause the processor to perform a method for presenting suggestions of related media content are provided, the method comprising: generating a transcript of a first media content item; receiving one or more social network posts associated with one or more other media content items; computing one or more correlations between text in the one or more social network posts and the transcript; ranking the social network posts based at least in part on the correlations to produce rankings; and causing one or more suggestions to view the one or more other media content items associated with the one or more social network posts based at least in part on the rankings to be presented.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Methods, systems, and media for presenting suggestions of related media content are provided.

In accordance with some embodiments, suggestions of media content items, which are determined to be related to a media content item which is being presented, can be presented. In some embodiments, the suggested media content items can be identified from posts on social networks which include media content items and/or include links to media content items. In some such embodiments, which media content items are suggested can be determined based on correlations computed between text included with the social network posts and a transcript of the media content item which is being presented.

Figure 1:
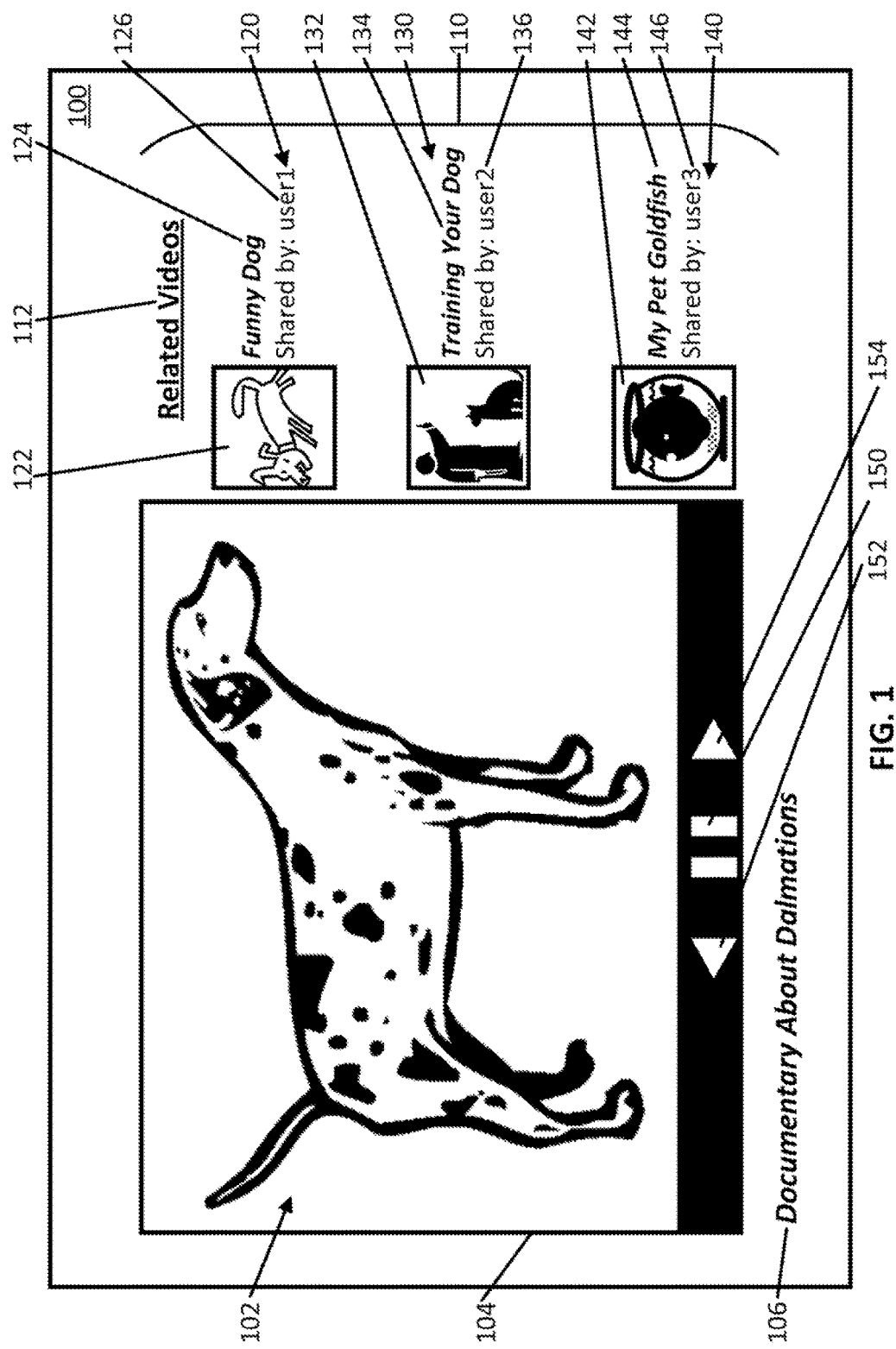
FIG. 1 shows an example of a user interface for presenting suggestions of related media content in accordance with some embodiments of the disclosed subject matter.

Turning to FIG. 1, an example 100 of a user interface for presenting suggestions of related media content is shown in accordance with some embodiments. As illustrated, user interface 100 can include a media content item 102, a media player window 104, a media content title 106, and a set of media content suggestions 110.

Media content item 102 can be any suitable media content item which is currently being presented, was presented, or is about to be presented. For example, in some embodiments, media content item 102 can include any suitable video content and/or audio content. As a more particular example, media content item 102 can include content such as video content, audio content, television programs, movies, cartoons, sound effects, audiobooks, streaming live content (e.g., a streaming radio show, a live concert, and/or any other suitable time of streaming live content), and/or any other suitable type of media content. In some embodiments, media content item 102 can be of any suitable length and can be stored on and delivered from any suitable entity.

Media player window 104 can be any suitable window within which media content item 102 can be presented. Media player window 104 can have any suitable appearance. For example, in some embodiments, media player window 104 can include a window in a user interface (e.g., user interface 100) in which media content item 102 is presented. As another example, in some embodiments, media player window 104 can be presented in a separate pop-up window. As yet another example, in some embodiments, media player window can include player controls, such as a pause button 150, a rewind button 152, and a fast-forward button 154.

Pause button 150, rewind button 152, and fast-forward button 154 can be used to control the presentation of media content item 102. For example, in some embodiments, pause button 150 can be used to pause presentation of media content item 102. In some such embodiments, if pause button 150 is selected (e.g., by clicking with a mouse, tapping on a touch screen, and/or any other selection technique), pause button 150 can be replaced by a play button (not shown). As another example, rewind button 152 can be used to rewind media content item 102 to an earlier point in the media content than what is currently being presented. Similarly, fast-forward button 154 can be used to skip media content item 102 to a later point in the media content than what is currently being presented.

Title 106 can indicate a title associated with media content item 102 in any suitable manner. For example, as shown in FIG. 1, title 106 can include a block of text. In some embodiments, title 106 can include any other suitable information, such as a creator of media content item 102, a date associated with media content item 102 (e.g., a date of upload, a date of creation, and/or any other suitable date), a number of views associated with media content item 102, and/or any other suitable information. In some embodiments, title 106 can include any suitable images, icons, animations, and/or any other suitable content. In some embodiments, title 106 can be omitted.

Set of media content suggestions 110 can indicate one or more suggestions of media content items determined to be related to media content item 102. In some embodiments, set of media content suggestions 110 can include a title 112 and individual media content suggestions 120, 130, and 140. Set of media content suggestions 110 can be presented in any suitable manner. For example, as shown in FIG. 1, set of media content suggestions 110 can be presented in a column next to media player window 104. As another example, in some embodiments, set of media content suggestions 110 can be presented in a pop-up window upon termination of a presentation of media content item 102. In some embodiments, set of media content suggestions 110 can be presented concurrently with media content item 102. Alternatively, in some embodiments, set of media content suggestions 110 can be presented when it is determined that presentation of media content item 102 is finished.

In some embodiments, title 112 can indicate that each of the individual media content suggestions in set of media content suggestions 110 is related to media content item 102. In some embodiments, title 112 can additionally or alternatively indicate any other suitable information, such as a name of a user watching media content item 102, information indicating that the related media content items were identified based on media content items watched by contacts of the user, and/or any other suitable information. Title 112 can include any suitable text, images, icons, graphics, animations, and/or any other suitable content. In some embodiments, title 112 can be omitted.

Individual media content suggestions 120, 130, and 140 can be determined using any suitable technique or combination of techniques, for example, as shown in and described in connection with FIG. 4. Although three individual media content suggestions are included as part of set of media content suggestions 110, any suitable number, including none, can be presented.

In some embodiments, individual media content suggestions 120, 130, and 140 can include thumbnails 122, 132, and 142, titles 124, 134, and 144, and contact indicators 126, 136, and 146. Although three items (thumbnails, titles, and contact indicators) are included with each individual media content suggestion, any suitable number of items can be included. For example, in some embodiments, any other suitable information such as a date associated with the suggested media content item, a number of views associated with a media content item, and/or any other information can be included. In some embodiments, any item included with an individual media content suggestion can include a link, which, when selected, can cause an associated media content item to begin being presented.

In some embodiments, thumbnails 122, 132, and 142 can each be an image associated with individual media content items 120, 130, and 140, respectively. For example, in some embodiments, thumbnails 122, 132, and/or 142 can be an image taken from a screen capture of the associated media content item. As another example, in some embodiments, thumbnails 122, 132, and/or 142 can be images indicating a topic associated with individual media content items 120, 130, and/or 140, respectively. As yet another example, in some embodiments, thumbnails 122, 132, and/or 142 can be images indicating the creator(s) of individual media content items 120, 130, and/or 140, respectively. Although individual media content items 120, 130, and 140 are shown as having one associated thumbnail each, in some embodiments, any suitable number of thumbnails can be included. In some embodiments, thumbnails 122, 132, and/or 142 can be omitted.

Titles 124, 134, and 144 can indicate titles associated with individual media content items 120, 130, and 140, respectively. In some embodiments, titles 124, 134, and/or 144 can include any suitable text, images, icons, graphics, and/or any other suitable content. Although individual media content items 120, 130, and 140 are shown as having one associated title each, in some embodiments, any suitable number of titles can be included. In some embodiments, titles 124, 134, and/or 144 can be omitted.

Contact indicators 126, 136, and 146 can indicate a name and/or a username of a contact of a user who has watched the associated media content item. Contact indicators 126, 136, and/or 146 can additionally or alternatively contain any other suitable information, such as a name, logo, and/or icon of a social network in which the associated media content item was shared and/or posted. Contact indicators 126, 136, and/or 146 can contain any suitable text, graphics, images, icons, and/or any other suitable content. For example, in some embodiments, contact indicators 126, 136, and/or 146 can include an avatar and/or a profile picture corresponding to one or more contacts who watched the associated media content item. As another example, in some embodiments, contact indicators 126, 136, and/or 146 can include a block of text indicating any text the contact posted when watching and/or sharing the associated media content item. As yet another example, in some embodiments, contact indicators 126, 136, and/or 146 can include any comments on a social network post which contained the associated media content item. In some embodiments, contact indicators 126, 136, and/or 146 can be omitted.

Figure 2:
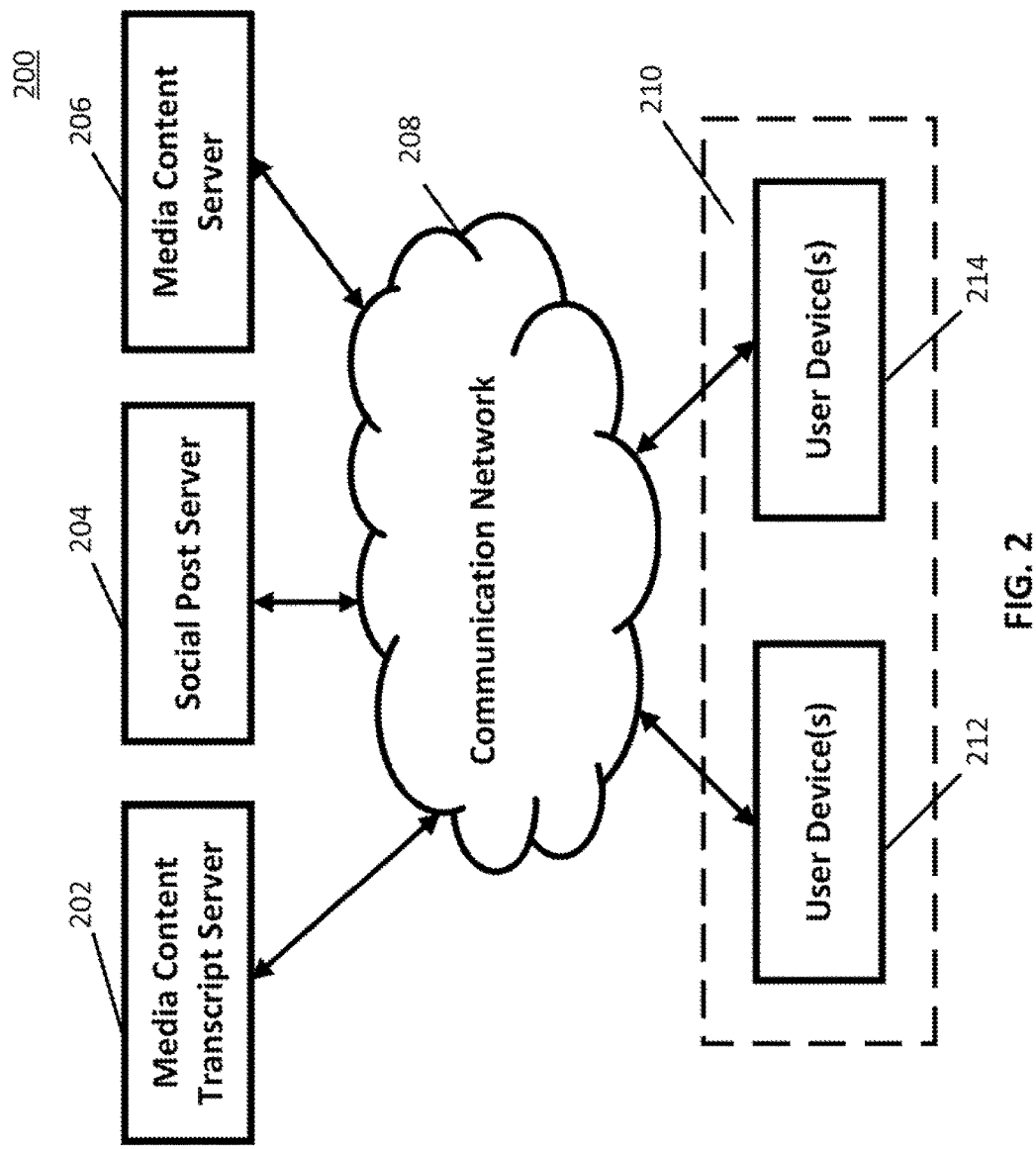
FIG. 2 shows a schematic diagram of an example of a system for presenting suggestions of related media content in accordance with some embodiments of the disclosed subject matter.

Turning to FIG. 2, an example 200 of hardware for presenting suggestions of related media content that can be used in accordance with some embodiments is shown. As illustrated, hardware 200 can include one or more servers, including a media content transcript server 202, a social post server 204, and a media content server 206, a communication network 208, and one or more user devices 210, such as user devices 212 and 214.

Media content transcript server 202 can be any suitable server for accessing, generating, storing, and/or transmitting transcripts of media content items in some embodiments. For example, in some embodiments, media content transcript server 202 can be a server that receives a request for a transcript of a particular media content item, and media content transcript server 202 can generate and deliver the transcript in response to the request. In some embodiments, media content transcript server 202 can be omitted.

Social post server 204 can be any suitable server for receiving, storing, and delivering social posts in some embodiments. For example, in some embodiments, social post server 204 can receive social posts from content uploaders and can deliver social posts to users, for example, in an aggregated feed. Social posts received by social post server 204 can be associated with any suitable social network(s) and can contain any suitable content (e.g., any suitable text, images, icons, media content, and/or any other suitable content). In some embodiments, social post server 204 can be omitted.

Media content server 206 can be any suitable server for storing media content and delivering the content to a user device 210 in some embodiments. For example, media content server 206 can be a server that streams media content to a user device 210 via communication network 208. Media content provided by media content server 206 can be any suitable content, such as video content, audio content, television programs, movies, cartoons, sound effects, audiobooks, streaming live content (e.g., a streaming radio show, a live concert, and/or any other suitable type of streaming live content), electronic books, and/or any other suitable type of media content. Media content can be created and uploaded to media content server 206 by any suitable entity. In some embodiments, media content server 206 can be omitted.

Communication network 208 can be any suitable combination of one or more wired and/or wireless networks in some embodiments. For example, communication network 208 can include any one or more of the Internet, a mobile data network, a satellite network, a local area network, a wide area network, a telephone network, a cable television network, a WiFi network, a WiMax network, and/or any other suitable communication network.

User devices 210 can include any one or more user devices suitable for receiving and/or presenting audio content. For example, in some embodiments, user devices 210 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some embodiments, user devices 210 can include non-mobile devices such as a desktop computer, a set-top box, a television, a streaming media player, a game console, or any other suitable non-mobile device.

Although media content transcript server 202, social post server 204, and media content server 206 are illustrated as separate devices, any one or more of these devices can be combined into one device in some embodiments. Also, although only one each of media content transcript server 202, social post server 204, and media content server 206 are shown in FIG. 2 to avoid over-complicating the figure, any suitable one or more of each device can be used in some embodiments.

Although two user devices 212 and 214 are shown in FIG. 2 to avoid over-complicating the figure, any suitable number of each of these devices, and any suitable types of these devices, can be used in some embodiments.

Figure 3:
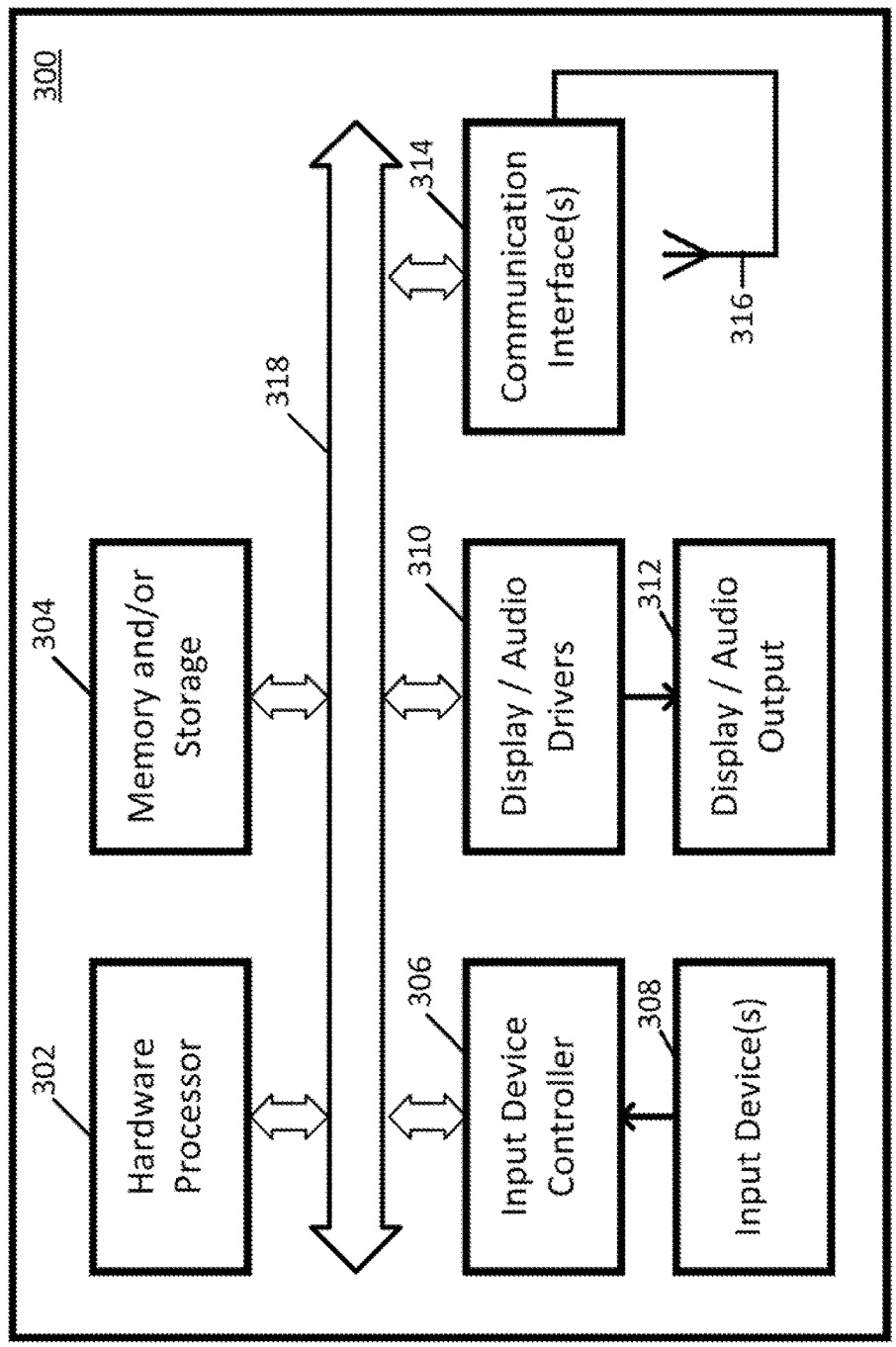
FIG. 3 shows an example of hardware that can be used in a server and/or a user device in accordance with some embodiments of the disclosed subject matter.

Media content transcript server 202, social post server 204, media content server 206, and user devices 210 can be implemented using any suitable hardware in some embodiments. For example, in some embodiments, devices 202, 204, 206, and 210 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output circuitries 312 in some embodiments. For example, display/audio drivers 310 can be circuitry for driving an LCD display, a speaker, an LED, or any other type of output device.

Communication interface(s) 314 can be any suitable circuitry for interfacing with one or more communication networks, such as network 208 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted when not needed.

Bus 318 can be any suitable mechanism for communicating between two or more components 302, 304, 306, 310, and 314 in some embodiments.

Any other suitable components can be included in hardware 300 in accordance with some embodiments.

Figure 4:
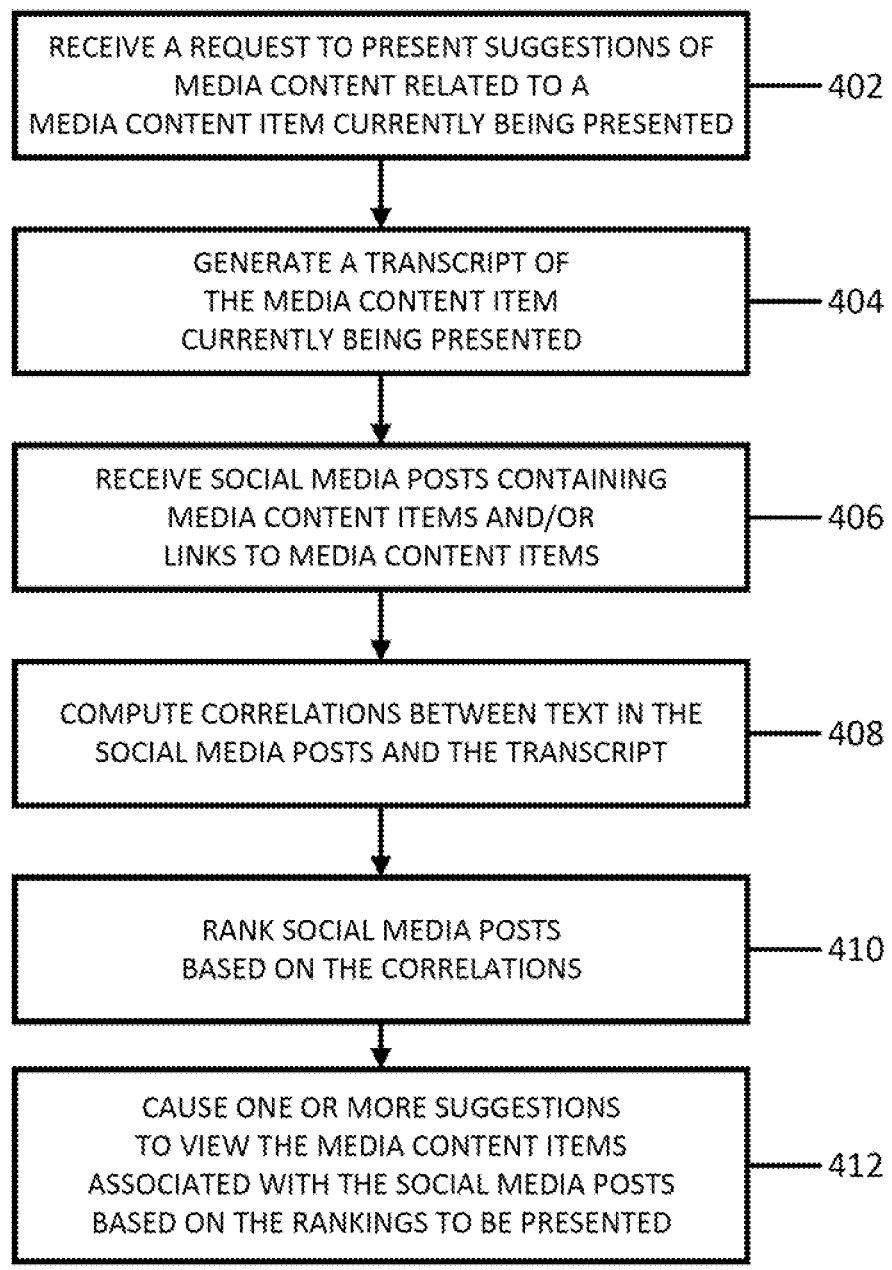
FIG. 4 shows an example of a process for presenting suggestions of related media content based on a transcript of a media content item and text contained in social network posts in accordance with some embodiments of the disclosed subject matter.

Turning to FIG. 4, an example 400 of a process for presenting suggestions of related media content based on a transcript of a media content item and text contained in social network posts is illustrated in accordance with some embodiments.

Process 400 can begin by receiving a request to present suggestions of media content related to an item of media content which is currently being presented at 402. The request can be generated by any suitable source and can be based on any suitable information. For example, in some embodiments, a request can be generated by a hardware processor 302 of a user device 210 determining that a media content item is being presented and that suggestions of media content related to the media content item are needed. As another example, a request can be generated by a hardware processor 302 of a media content server 206 when it is determined that a selection mechanism (e.g., a play button) associated with a media content item has been selected and that suggestions of media content related to the media content item are needed. As yet another example, in some embodiments, a request can be generated by a hardware processor 302 of a media content server 206 determining that a particular amount (e.g., a quarter, a half, and/or any other suitable amount) of a media content item has been presented and that suggestions of media content items related to the media content item are needed. In some embodiments, the request can be received by any suitable device, for example, media content server 206 and/or user device 210.

Process 400 can generate a transcript of the media content item which is currently being presented at 404. The transcript can be generated based on any suitable information and can be generated using any suitable technique or combination of techniques.

For example, in some embodiments, a transcript can be generated by accessing a previously generated transcript that was created by manual transcription by a human. In some such embodiments, process 402 can access the manually created transcription with any suitable information. For example, in some embodiments, the manually created transcript can be stored in association (e.g., in a table, an associative array, and/or any other suitable data structure) with the media content item (e.g., on a media content server 206), and process 400 can access the transcript based on this information. In some embodiments, process 400 can perform any suitable processing on the manual transcript to generate a suitable transcript of the media content item. As a more particular example, in some embodiments, process 400 can correct misspellings, normalize capitalization, translate the transcript to another language, and/or perform any other suitable processing.

As another example, in some embodiments, process 400 can generate a transcript of the media content item at 402 by accessing captions and/or subtitles associated with the media content item. Process 400 can generate the transcript based on the captions and/or the subtitles using any suitable techniques or combination of techniques. For example, in some embodiments, process 400 can access a file (e.g., stored on a media content server 206) containing the captions and/or the subtitles and can search for and remove indications of irrelevant information. As a more particular example, in some embodiments, process 400 can remove any timestamps, indications of applause, indications of laughter, indications of music, and/or any other suitable information. In some such embodiments, process 400 can use any suitable technique or combination of techniques to identify and/or remove irrelevant information such as searching for and deleting a particular word, searching for and deleting a particular phrase, and/or any other suitable techniques.

As yet another example, in some embodiments, process 400 can dynamically generate a transcript of the media content item at 404 using any suitable technique or combination of techniques. For example, in some embodiments, one or more speech recognition techniques can be used by a hardware processor 302 on a media content transcript server 202 to identify speech tokens (e.g., phonemes, syllables, words, phrases, sentences, and/or any other suitable unit of speech) contained in an audio portion of the media content item. As a more particular example, in some embodiments, specific phonemes can be identified based on the output of a neural network. As another particular example, in some embodiments, specific syllables or specific vowels can be identified based on characteristics of a spectrogram (e.g., location of formants, duration of formants, and/or any other suitable characteristics) of the audio portion of the media content item. As yet another particular example, in some embodiments, the transcript can be generated by identifying specific words and/or phrases. In some such embodiments, any suitable speech recognition techniques can be used. For example, any suitable acoustic model mapping sounds to words can be used. As another example, any suitable language model (e.g., a bigram model, a trigram model, and/or any other suitable model) of a statistical distribution for the likelihood of an occurrence of a particular combination of words can be used. In some embodiments, process 400 can combine multiple techniques to identify speech tokens at different levels of speech. For example, in some embodiments, process 400 can identify both phonemes and phrases comprised of multiple words. In some embodiments, process 400 can generate the transcript one time per media content item and can store the generated transcript for future use.

Process 400 can receive social network posts containing media content items and/or links to media content items at 406. Social network posts received by process 400 can be received from any suitable person, entity, or social network or combination of social networks. For example, in some embodiments, process 400 can receive social network posts created by and uploaded to a social network by a contact of a user (e.g., a connection on the social network). As another example, in some embodiments, process 400 can receive social network posts created by and uploaded to a social network by a company. Any suitable number of social network posts can be received by process 400. In some embodiments, social network posts received by process 400 can be restricted to social network posts that were posted publically (that is, not designated as private). Additionally or alternatively, in some embodiments, consent from a creator of a social network post can be required before the social network post is received by process 400.

The social network posts received by process 400 at 406 can contain any suitable media content items and/or links to media content items. For example, in some embodiments, the social network posts can include attachments of audio and/or video files. As another example, in some embodiments, the social network posts can include links to Web sites which can stream media content items (e.g., songs, videos, audiobooks, television broadcasts, and/or any other suitable media content). In some embodiments, a single social network post can contain more than one media content item and/or link to a media content item.

In some embodiments, the social network posts received at 406 can contain text associated with the included media content item and/or the link to a media content item. For example, in some embodiments, the social network post can include the creator's thoughts regarding the included media content item.

In some embodiments, process 400 can request that only social network posts meeting a particular criteria be received. For example, the criteria can include whether the social network posts include one or more keywords (e.g., the most frequently used word(s) and/or the most important word(s)) contained in the transcript and/or include one or more words related to the keywords. As a specific example, if it is determined that "dog" is a keyword in the transcript, process 400 can request that only social network posts containing the words "dog," "pet," "bark," "puppy," and/or any other related words be received. In embodiments in which the criteria include whether the social network posts contain one or more keywords, the keywords can be determined using any suitable technique or combination of techniques. For example, in some embodiments, a hardware processor 302 on a media content transcript server 202 can determine the most frequently used word(s) by creating a histogram of words and/or phrases in the transcript. In some such embodiments the transcript can be pre-processed to remove common words such as "a," "the," and/or any other common words. Additionally or alternatively, in some embodiments, words can be stemmed to identify words with the same root but with different suffixes and/or parts of speech (e.g., "introduce" and "introduction"), and such words can be treated equivalently when determining the most frequently used word(s) in the transcript. As another example, in some embodiments, the most important word(s) in the transcript can be determined using Term Frequency-Inverse Document Frequency (TF-IDF) analysis to determine the most frequently used word(s) while accounting for words that are common across different transcripts (e.g., "a," "the," and/or any other common words) and/or words that are common across different transcripts corresponding to a particular genre of media content (e.g., "slide" in transcripts corresponding to lectures).

At 408, process 400 can compute correlations between the text contained in the social network post and the transcript of the media content item being presented. The correlations can be computed using any suitable technique or combination of techniques.

For example, in some embodiments, process 400 can compute a correlation between a social network post and the transcript by determining a degree to which text in the social network post overlaps with words in the transcript. As a more particular example, in some embodiments, process 400 can compute a correlation between a social network post and the transcript based on how frequently words in the text associated with the social network post appear in a set of the most frequent words of the transcript. As a specific example, if the most common word in the transcript is determined to be "dog," social network posts containing instances of the word "dog" can be determined to have a high correlation with the transcript. More specifically, in some embodiments, a social network post containing more instances of the word "dog" can be determined to have a higher correlation with the transcript than a social network post with fewer or no instances of the word "dog." The set of the most frequent words of the transcript can be determined using any suitable technique or combination of techniques, for example, the techniques to determine the most frequently used word(s) in a transcript described above in connection with block 406. The set of the most frequent words in the transcript can include any suitable number of words (e.g., one, five, ten, twenty, and/or any other suitable number).

In some embodiments, each word in the set of the most frequent words in the transcript can be associated with a weight. For example, a proper noun (e.g., a name of a person, a name of a song, a name of a company, and/or any other suitable proper noun) can have a higher weight compared to other nouns. In some such embodiments, a correlation between text in a social network post and the transcript can be computed as a weighted sum of how many times words in the text associated with the social network post appear in the set of the most frequent words in the transcript.

In some embodiments, any suitable text processing techniques may additionally or alternatively be used to account for misspellings, variations in typing (e.g., capitalization), and/or any other sources of variance. For example, fuzzy string searching, normalization of letter-case, use of a dictionary to account for use of different words with the same meaning, use of a dictionary to account for words used in different languages, and/or any other suitable techniques can be used. Additionally or alternatively, in some embodiments, sentiment analysis can be used to determine if text contained in a social network post contains positive and/or negative references to the associated media content item.

The correlations can be computed on any suitable device, for example, a media content server 206. As a more particular example, the transcript and/or characteristics of the transcript (e.g., the set of the most frequent words in the transcript, and/or any other suitable characteristics) can be sent from a media content transcript server 202 to the media content server 206 via communication network 208. In some embodiments, a hardware processor 302 on media content server 206 can then compute correlations between the text associated with one or more social networks posts and the transcript by implementing the techniques described above.

Process 400 can rank the social network posts based at least in part on the computed correlations at 410. The social network posts can be ranked based on any suitable information. For example, in some embodiments, the social network posts can be ranked based solely on the computed correlations. As a more particular example, in some embodiments, the social network posts with higher correlations with the transcript of the media content item can be ranked higher than social network posts with lower correlations with the transcript of the media content item. As another example, in some embodiments, the social network posts can be ranked based on both the computed correlations and additional information. As a more particular example, the social network posts can be ranked based at least in part on the relationship between the creator of a social network post and the user viewing the media content item. More specifically, in some embodiments, social network posts created by people with a closer and/or stronger relationship to the user viewing the media content item can be ranked higher. In some such embodiments, the closeness of the relationship between the creator of the social network post and the media content viewer can be evaluated with any suitable metric, such as the number of common contacts on a social network, the number of interactions on a social network, and/or any other suitable metric. As another particular example, the social network posts can be ranked based at least in part on other media content items a user, or persons associated with the media content items, has previously watched. In some embodiments, any suitable information can be combined in any suitable manner to determine rankings of the social network posts.

Process 400 can cause one or more suggestions of media content related to the media content item currently being viewed to be presented based on the rankings of the social network posts at 412. Any suitable number of suggestions (e.g., one, two, five, and/or any other number) can be presented, and the suggestions can be presented in any suitable manner. For example, in some embodiments, the suggestions can be presented with any suitable information. As a more particular example, in some embodiments, the suggestions can be presented with a thumbnail image associated with the media content item, a title associated with a media content item, and a name of the creator of the social network post associated with the media content item, as shown in and described in connection with FIG. 1. As another example, in some embodiments, the suggestions can be presented in an order based on the rankings (e.g., a suggestion for the media content item associated with the highest ranked social network post can be presented more prominently relative to other suggestions). As yet another example, the suggestions can be presented in any suitable location in a user interface. For example, as shown in and described in connection with FIG. 1, the suggestions can be presented in a strip next to the presentation of the media content item. As still another example, in some embodiments, the suggestions can be presented after the media content item is finished being presented (e.g., on a new page, in a pop-up window, in a panel that appears in the user interface, and/or in any other suitable manner).

Process 400 can cause the one or more suggestions of related media content to be presented using any suitable technique or combination of techniques. For example, in embodiments in which the suggestions are presented in a user interface on a user device 210, a hardware processor 302 on user device 210 can cause the user interface to be presented by directing display/audio drivers 310 to present the user interface to display/audio output 312.

It should be understood that at least some of the above described blocks of the process of FIG. 4 can be executed or performed in any order or sequence not limited to the order and sequence shown in and described in the figure. Also, some of the above blocks of FIG. 4 can be executed or performed substantially simultaneously where appropriate or in parallel to reduce latency and processing times. Additionally or alternatively, some of the above described blocks of processes of FIG. 4 can be omitted.

In some embodiments, any of the above described blocks of the process of FIG. 4 can be executed or performed by any of the hardware processors of any of media content transcript server 202, social post server 204, media content server 206, and/or user device 210, or any suitable combination thereof.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting suggestions of related media content, comprising:
   generating, using a hardware processor, a transcript of a first media content item, wherein the transcript indicates spoken words in audio content of the first media content item;
   receiving one or more social network posts associated with one or more other media content items;
   computing one or more correlations between text in the one or more social network posts and the transcript, wherein the correlations indicate overlap between the spoken words in the audio content of the first media content item and the text in the one or more social network posts;
   ranking the social network posts based at least in part on the correlations to produce rankings;
   determining that the first media content item is being presented on a user device; and
   in response to determining that the first media content item is being presented on the user device, causing one or more suggestions to view the one or more other media content items associated with the one or more social network posts based at least in part on the rankings to be presented.

2. The method of claim 1, wherein the one or more social network posts contain links to the one or more other media content items.

3. The method of claim 1, wherein the transcript is generated based at least in part on a manual transcription of the first media content item.

4. The method of claim 1, wherein the transcript is generated based at least in part on captions associated with the first media content item.

5. The method of claim 1, wherein the transcript is generated using one or more speech recognition techniques.

6. The method of claim 1, wherein the correlations are computed based at least in part on how frequently one or more words in text associated with the social network posts appear in the transcript.

7. The method of claim 1, wherein the one or more social network posts are received from two or more different social networks.

8. A system for presenting suggestions of related media content, the system comprising:
- a hardware processor that is configured to:
  - generate a transcript of a first media content item, wherein the transcript indicates spoken words in audio content of the first media content item;
  - receive one or more social network posts associated with one or more other media content items;
  - compute one or more correlations between text in the one or more social network posts and the transcript, wherein the correlations indicate overlap between the spoken words in the audio content of the first media content item and the text in the one or more social network posts;
  - rank the social network posts based at least in part on the correlations to produce rankings;
  - determine that the first media content item is being presented on a user device; and
  - in response to determining that the first media content item is being presented on the user device, cause one or more suggestions to view the one or more other media content items associated with the one or more social network posts based at least in part on the rankings to be presented.

9. The system of claim 8, wherein the one or more social network posts contain links to the one or more other media content items.

10. The system of claim 8, wherein the transcript is generated based at least in part on a manual transcription of the first media content item.

11. The system of claim 8, wherein the transcript is generated based at least in part on captions associated with the first media content item.

12. The system of claim 8, wherein the transcript is generated using one or more speech recognition techniques.

13. The system of claim 8, wherein the correlations are computed based at least in part on how frequently one or more words in text associated with the social network posts appear in the transcript.

14. The system of claim 8, wherein the one or more social network posts are received from two or more different social networks.

15. A non-transitory computer-readable medium containing computer executable instructions that, when executed by a processor, cause the processor to perform a method for presenting suggestions of related media content, the method comprising:
- generating a transcript of a first media content item, wherein the transcript indicates spoken words in audio content of the first media content item;
- receiving one or more social network posts associated with one or more other media content items;
- computing one or more correlations between text in the one or more social network posts and the transcript, wherein the correlations indicate overlap between the spoken words in the audio content of the first media content item and the text in the one or more social network posts;
- ranking the social network posts based at least in part on the correlations to produce rankings;
- determining that the first media content item is being presented on a user device; and
- in response to determining that the first media content item is being presented on the user device, causing one or more suggestions to view the one or more other media content items associated with the one or more social network posts based at least in part on the rankings to be presented.

16. The non-transitory computer-readable medium of claim 15, wherein the one or more social network posts contain links to the one or more other media content items.

17. The non-transitory computer-readable medium of claim 15, wherein the transcript is generated based at least in part on a manual transcription of the first media content item.

18. The non-transitory computer-readable medium of claim 15, wherein the transcript is generated based at least in part on captions associated with the first media content item.

19. The non-transitory computer-readable medium of claim 15, wherein the transcript is generated using one or more speech recognition techniques.

20. The non-transitory computer-readable medium of claim 15, wherein the correlations are computed based at least in part on how frequently one or more words in text associated with the social network posts appear in the transcript.

21. The non-transitory computer-readable medium of claim 15, wherein the one or more social network posts are received from two or more different social networks.

* * * * *